Figure 1:
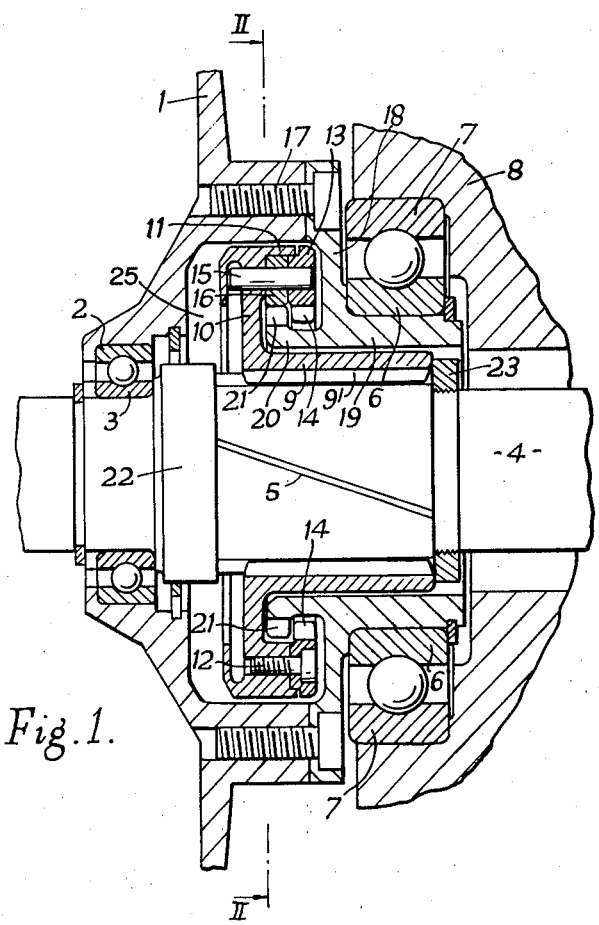

May 30, 1961 H. SINCLAIR ET AL 2,986,249
SYNCHRONOUS SELF-SHIFTING CLUTCHES
Filed March 26, 1959 2 Sheets-Sheet 2

INVENTORS
Harold Sinclair
Herbert Arthur Clements
BY
Benjamin Sweedler
ATTORNEY

United States Patent Office 2,986,249
Patented May 30, 1961

2,986,249
SYNCHRONOUS SELF-SHIFTING CLUTCHES
Harold Sinclair, London, and Herbert Arthur Clements, Bracknell, England, assignors to S.S.S. Gears Limited, Isleworth, Middlesex, England, a British company Filed Mar. 26, 1959, Ser. No. 802,065
Claims priority, application Great Britain Apr. 25, 1958
1 Claim. (Cl. 192—67)

This invention relates to synchronous self-shifting clutches of the type comprising a first clutch member provided with clutch teeth, a second clutch member mounted co-axially with said first clutch member, an intermediate member, provided with clutch teeth, carried by said second clutch member and constrained for helical movement with respect thereto into and out of toothed engagement with said first clutch member, and a ratchet drive for effecting precise inter-engagement of the clutch teeth of said intermediate member with the clutch teeth of said first clutch member.

In clutches of this general type the said ratchet drive comprises one or more pawls or the equivalent carried by one of said first and intermediate members and adapted to cooperate with projections, e.g. ratchet teeth, carried by the other of said first and intermediate members. The term "pawls or the equivalent" used herein includes spring actuated pawls that are angularly movable in radial sense with respect to the clutch axis. As will be seen, the present invention relates to the case in which the pawls are carried by the intermediate member and cooperate with projections carried by the said first clutch member.

In connection with clutches of this type, problems arise as the ratchetting speed and duration and the size of the clutch are increased, due to the increasing tendency of the pawls to chatter and rebound, with consequent impact and resulting wear on the pawls and the coacting surfaces of the ratchet teeth. The object of the present invention is to provide a clutch of the type referred to, in which these difficulties are reduced or eliminated.

In the specification of co-pending patent application No. 679,228 there are described and claimed clutches of the type referred to above, in which with the object of overcoming the above-mentioned problems, ratchetting movement of the pawl or pawls is damped by liquid which is substantially undisturbed by parts in motion relative thereto, at least in the vicinity of the ratchet drive. In one embodiment of the invention disclosed in the said specification, pawls are carried by the intermediate member and are damped by liquid in a chamber rotatable with the first clutch member. In another embodiment described in the said specification pawls are carried by the first clutch member and are damped by liquid in a chamber rotatable with the first clutch member.

In accordance with the present invention the ratchet drive comprises at least one pawl which is carried by the intermediate member and which during ratchetting is damped by liquid in a chamber rotatable with the intermediate member.

Figure 2:
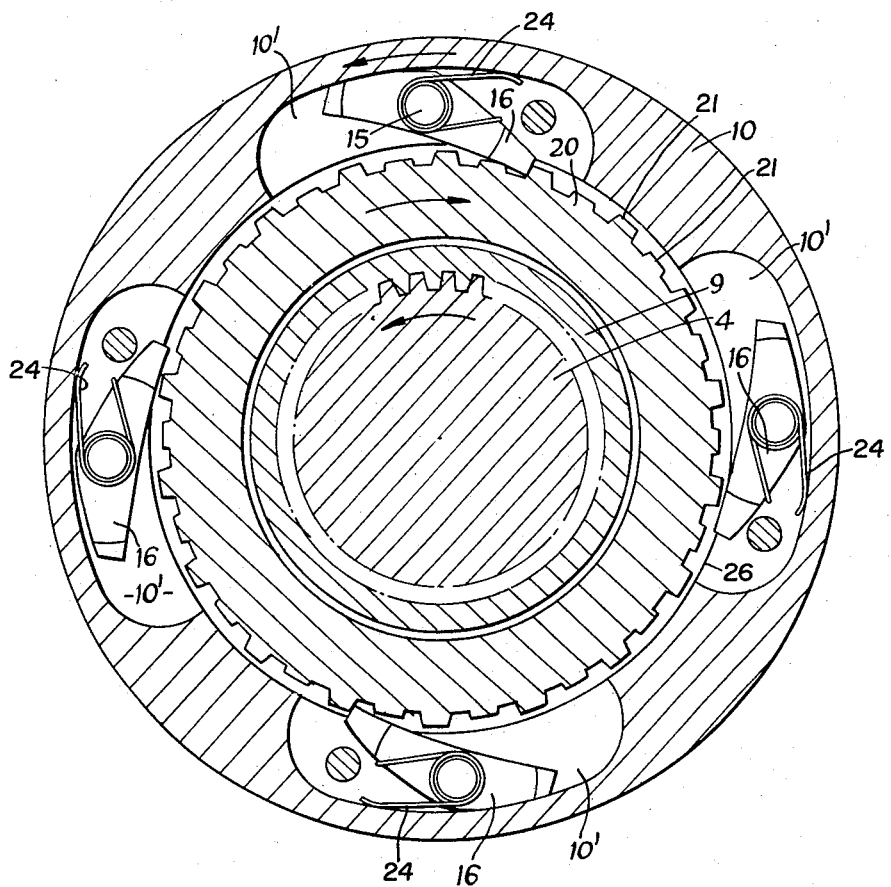

In order that the invention may be clearly understood and readily carried into effect it will now be described in more detail with reference to the accompanying drawings, in which:

Fig. 1 is a view in longitudinal section of a clutch in accordance with the invention, and Fig. 2 is a section on the line II—II of Fig. 1.

Referring to Figs. 1 and 2, the first clutch member 1 is journalled at 2, 3 on the second clutch member which is formed by a shaft 4 and which has external helical right-handed splines 5. The first clutch member 1 is also journalled at 6, 7 in a stationary housing 8 rotatable with shaft 4. On shaft 4 is mounted an intermediate member 9 formed with internal helical splines 9′ which are engaged with the external splines 5, so that the intermediate member 9 is constrained for helical movement axially relative to the shaft 5. The intermediate member 9 is formed with an outwardly extending radial flange 10 formed with an external cylindrical flange 11 which extends parallel to the shaft 4. To the flange 10 is fixed, by means of bolts 12, a ring 13 formed with a ring of internal clutch teeth 14, the ring 13 forming in conjunction with recesses in the flange 10 a series of chambers 10′ which are open towards the shaft 4. Pawl pins, one of which is shown at 15, project through the flange 10 and the ring 13, each pin carrying a pawl 16 which is wholly disposed in its associated chamber 10′ with the exception of a small nose portion which extends radially inwards as shown in Fig. 2.

The first clutch member 1 has fixed to it by means of bolts 17 an annular member comprising a ring 18 which projects radially inwards towards the intermediate member 9 and which has at its inner periphery a sleeve 19 that is carried in the ball-race 6, and has an extension 20 which is coaxial with the shaft 4 and carries a ring of clutch teeth 21 adjacent to the clutch teeth 14.

There may be 36 clutch teeth 21, and as shown in Fig. 2 they comprise groups of two teeth, i.e., one short tooth and one long tooth. The pawls 16 are four in number, arranged in diametrically opposite pairs so that when either pair of opposite pawls have their noses in engagement with long teeth 21 the noses of the other pair are mid-way between two successive long teeth 21. Control springs 24 urge the noses of the pawls radially inwards.

Viewing the pawls 16 and teeth 21 from the left-hand side of Fig. 1, viz., as shown in Fig. 2, the noses of the pawls 16 point in clockwise direction. If the shaft 4 is rotating in anti-clockwise direction relative to the clutch member 1, the pawls 16 move in anti-clockwise direction relative to the clutch teeth 21 and ratchet past them, so that the intermediate member 9 remains in the axial position shown in Fig. 1 in which its clutch teeth 14 are out of engagement with the clutch teeth 21. If the direction of relative rotation of the shaft 4 relative to the first clutch member 1 tends to reverse, a pair of diametrically opposite pawls 16 are engaged by long teeth 21, and the intermediate member 9 is thereby shifted helically along the shaft 4, from right to left in Fig. 1, thereby bringing its clutch teeth 14 into engagement with the clutch teeth 21. Axial movement of the intermediate member 9 beyond the position of full toothed engagement is limited by a stop formed by a shoulder 22 on the shaft 4. Upon a reversal of the relative rotation, the interaction of the clutch teeth 14 and 21 moves the intermediate member 9 back along the shaft 4 until it comes against the stop 23 with its clutch teeth 14 disengaged from the clutch teeth 21 and the pawls 16 in ratchetting relation with the clutch teeth 21.

The pawls 16 fit fairly closely in the above-mentioned chambers 10′ in the intermediate member 9, to which a liquid is continuously supplied at a sufficiently high rate of ensure that during rotation of the intermediate member 9 each chamber 10′ is completely filled with liquid, in which the major portion of the associated pawl is immersed. A jet of liquid, e.g. oil, may be employed for this purpose but preferably the normal supply of lubricating oil through the bearing 2, 3 is relied on to provide the required supply of liquid to the said chamber. Oil passing through the bearing into the cavity 25 in clutch member 1 accumulates therein to a sufficient depth to maintain the chambers 10' filled with oil, the chambers 10' being constructed to retain oil therein under centrifugal action during rotation of intermediate member 9, to the radial depth determined by the circle 26 which is just clear of the tips of the clutch teeth 21. Hence, the rotation of the first clutch member 1 together with the said clutch teeth 21 relative to the oil in the chambers 10' associated with the intermediate member 9 does not cause heavy impact and turbulence of the oil in the chambers 10' against the undersides of the pawls 16.

We claim:

A synchronous self-shifting clutch comprising a first rotary clutch member provided with clutch teeth, a second rotary clutch member mounted coaxially with said first clutch member, an intermediate member carried by said second clutch member, clutch teeth on said intermediate member inter-engageable with the clutch teeth of said first clutch member, means constraining said intermediate member for helical movement relative to said second clutch member into and out of toothed engagement with said first clutch member, a ratchet drive for initiating precise inter-engagement of the clutch teeth of said intermediate member with the clutch teeth of said first clutch member, said ratchet drive comprising at least one pawl carried by said intermediate member, a control spring for said pawl, projections, serving as ratchet teeth, carried by said first clutch member, and a chamber rotatable with said intermediate member, said chamber being constructed to retain liquid therein during rotation of said intermediate member, at least a part of said pawl being disposed in said chamber, and said chamber having a retaining wall controlling the radial depth of said liquid therein, said retaining wall having a radially inner diameter that is just clear of the tips of said ratchet teeth.

References Cited in the file of this patent

UNITED STATES PATENTS

| 2,323,353 | Plog | July 6, 1943 |
| 2,433,428 | Carnagua et al. | Dec. 30, 1947 |
| 2,515,114 | Chilton | July 11, 1950 |

FOREIGN PATENTS

| 1,130,860 | France | Oct. 8, 1956 |